(12) United States Patent
Toyoizumi et al.

(10) Patent No.: US 6,433,909 B2
(45) Date of Patent: *Aug. 13, 2002

(54) IMAGE FORMING APPARATUS

(75) Inventors: Kiyoto Toyoizumi, Odawara; Junichi Kimizuka, Yokohama, both of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/207,137

(22) Filed: Dec. 8, 1998

(30) Foreign Application Priority Data

Dec. 10, 1997 (JP) ............................................. 9-339802

(51) Int. Cl.⁷ ............................................... G02B 26/08
(52) U.S. Cl. ........................ 359/204; 359/216; 347/234; 347/235
(58) Field of Search ................................ 359/204, 216; 347/234, 235; 250/234, 235, 236

(56) References Cited

U.S. PATENT DOCUMENTS

| | | | |
|---|---|---|---|
| 4,695,714 A | 9/1987 | Kimizuka et al. | 250/205 |
| 4,816,845 A | 3/1989 | Soya et al. | 346/108 |
| 4,890,288 A | 12/1989 | Inuyama et al. | 372/31 |
| 4,933,549 A * | 6/1990 | Fujioka | 250/235 |
| 4,990,763 A | 2/1991 | Shinada | 250/205 |
| 5,115,147 A | 5/1992 | Kusano et al. | 307/311 |
| 5,444,239 A | 8/1995 | Nacman et al. | 250/235 |
| 5,495,281 A | 2/1996 | Nashida et al. | 347/263 |
| 5,754,214 A * | 5/1998 | Okino | 347/229 |
| 5,883,657 A * | 3/1999 | Minakuchi | 347/235 |
| 5,995,246 A * | 11/1999 | Komiya | 358/481 |

FOREIGN PATENT DOCUMENTS

| | | |
|---|---|---|
| EP | 0 412 036 A2 | 2/1991 |
| EP | 0 812 101 A2 | 12/1997 |

* cited by examiner

*Primary Examiner*—Cassandra Spyrou
*Assistant Examiner*—Leo Boutsikaris
(74) *Attorney, Agent, or Firm*—Fitzpatrick, Cella, Harper & Scinto

(57) ABSTRACT

In an image forming apparatus, a plurality of laser beams are emitted by a plurality of laser sources and are scanned onto a recording medium. The laser beams scanned are detected by two light-receiving elements juxtaposed in a main scanning direction. The output signals from the two light-receiving elements are compared so that a reference timing signal indicating that each of the scanned laser beams has reached a substantially middle position between the two light-receiving elements is outputted. The write operations of the plurality of laser sources in the main scanning direction are controlled to be synchronized on the basis of the respective reference timing signals.

12 Claims, 15 Drawing Sheets

IMAGE FORMING APPARATUS

BACKGROUND OF THE INVENTION

1. Field of the Invention

The present invention relates to a multi-beam write image forming apparatus for optically writing using a plurality of light beams.

2. Related Background Art

In a conventional multi-beam write scheme, a plurality of semiconductor lasers are used, and laser beams emitted by these semiconductor lasers are simultaneously scanned in the main scanning direction on a photosensitive body to simultaneously write a plurality of lines. It is important in such write scheme to align the start points of the individual beams in the main scanning direction so as to obtain a high-precision recorded image. In a conventional system, for example, two laser beams reflected by a rotary polygonal mirror 100 are split by a polarization beam splitter 101, and the split laser beams are respectively detected by photodetection elements 102 and 103, respectively. The signals output from these two photodetection elements 102 and 103 are used as reference timings of the individual laser beams, and a write starts on a photosensitive body a predetermined period of time after the photodetection elements 102 and 103 detect the laser beams.

However, in such detection method, a plurality of optical elements such as a polarization beam splitter, photodetection elements, and the like are required, and the apparatus arrangement is complicated. Also, depending on the setup angle of the polarization beam splitter and mounting precision of the photodetection elements, the time from the detection of the two laser beams to the write start positions changes. For this reason, upon mounting these polarization beam splitter and photodetection elements, strict mounting precision is required, resulting in time-consuming mounting.

Also, since the amount of light that becomes incident on each photodetection element changes due to variations in reflectance and contaminations of the respective reflection surfaces of the rotary polygonal mirror, the time required until the threshold value of each photodetection element is exceeded changes, and the generation timing of the output signal of each photodetection element also changes. However, when the timing of the output signal of the photodetection element has changed, since the reference timings of two lines are determined by the output signals from the respective photodetection elements, the write start positions of the two laser beams in the main scanning direction deviate, and the start points in the main scanning direction cannot be accurately aligned.

SUMMARY OF THE INVENTION

The present invention has been made in consideration of the conventional problems, and has as its object to provide an image forming apparatus which can obtain a high-precision recorded image free from any deviation of a plurality of write lines with a simple arrangement.

The object of the present invention is achieved by an image forming apparatus, which comprises a plurality of laser sources and writes a plurality of lines on an image carrier by simultaneously scanning laser beams emitted by the respective laser sources in the main scanning direction, characterized by comprising two light-receiving elements juxtaposed in the main scanning direction to detect the laser beams emitted by the plurality of laser sources prior to scanning in the main scanning direction, means for turning on spots formed by the laser beams from the plurality of laser sources in the order from a leading spot, and means for comparing output signals from the two light-receiving elements, and outputting a reference timing signal indicating that each spot has reached a reference position when the spot is located at substantially the middle position between the two light-receiving elements, and in that write operations of the plurality of laser sources in the main scanning direction are synchronized on the basis of the output reference timing signal of the spots.

An image forming apparatus according to the present invention is characterized by comprising:

a plurality of laser sources;

scanning means for scanning laser beams emitted by the plurality of laser sources onto a recording medium;

two light-receiving elements juxtaposed in a main scanning direction to detect the laser beams scanned by the scanning means;

means for comparing output signals from the two light-receiving elements, and outputting a reference timing signal indicating that each of the scanned laser beams has reached a substantially middle position between the two light-receiving elements; and control means for synchronizing write operations of the plurality of laser sources in the main scanning direction on the basis of the reference timing signal.

The image forming apparatus according to the present invention is characterized in that the two light-receiving elements detect the laser beams scanned by the scanning means prior to scanning on the recording medium in the main scanning direction.

The image forming apparatus according to the present invention is characterized in that when the laser beams scanned by the scanning means pass surfaces of the two light receiving elements, the plurality of laser sources are turned on in an order from a leading laser beam.

The image forming apparatus according to the present invention is characterized in that a downstream one of the two light-receiving elements in the main scanning direction has a width smaller than an upstream light-receiving element.

The image forming apparatus according to the present invention is characterized in that the two light-receiving elements comprise a 2-split photodetection element split in the main scanning direction.

The image forming apparatus according to the present invention is characterized in that when each of the laser beams scanned by the scanning means has exceeded the substantially middle position between the two light-receiving elements, the scanned laser beam is turned off.

The image forming apparatus according to the present invention is characterized in that the two light-receiving elements include upstream and downstream light-receiving elements, and when each of the laser beams scanned by the scanning means falls substantially outside the upstream light-receiving element, the scanned laser beam is turned off.

DETAILED DESCRIPTION OF THE PREFERRED EMBODIMENTS

Figure 1:
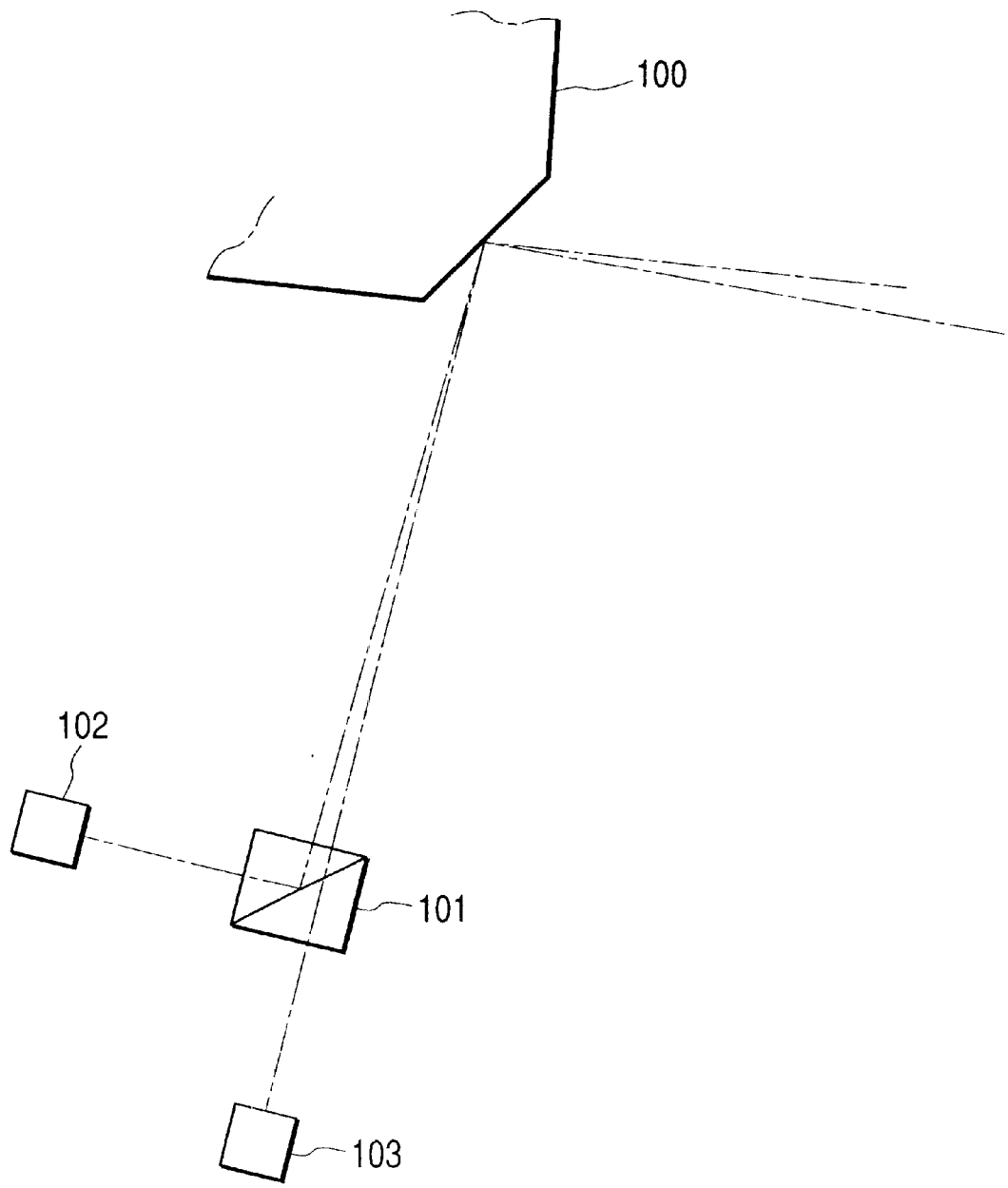
FIG. 1 is a view showing a conventional image forming apparatus.
Figure 2:
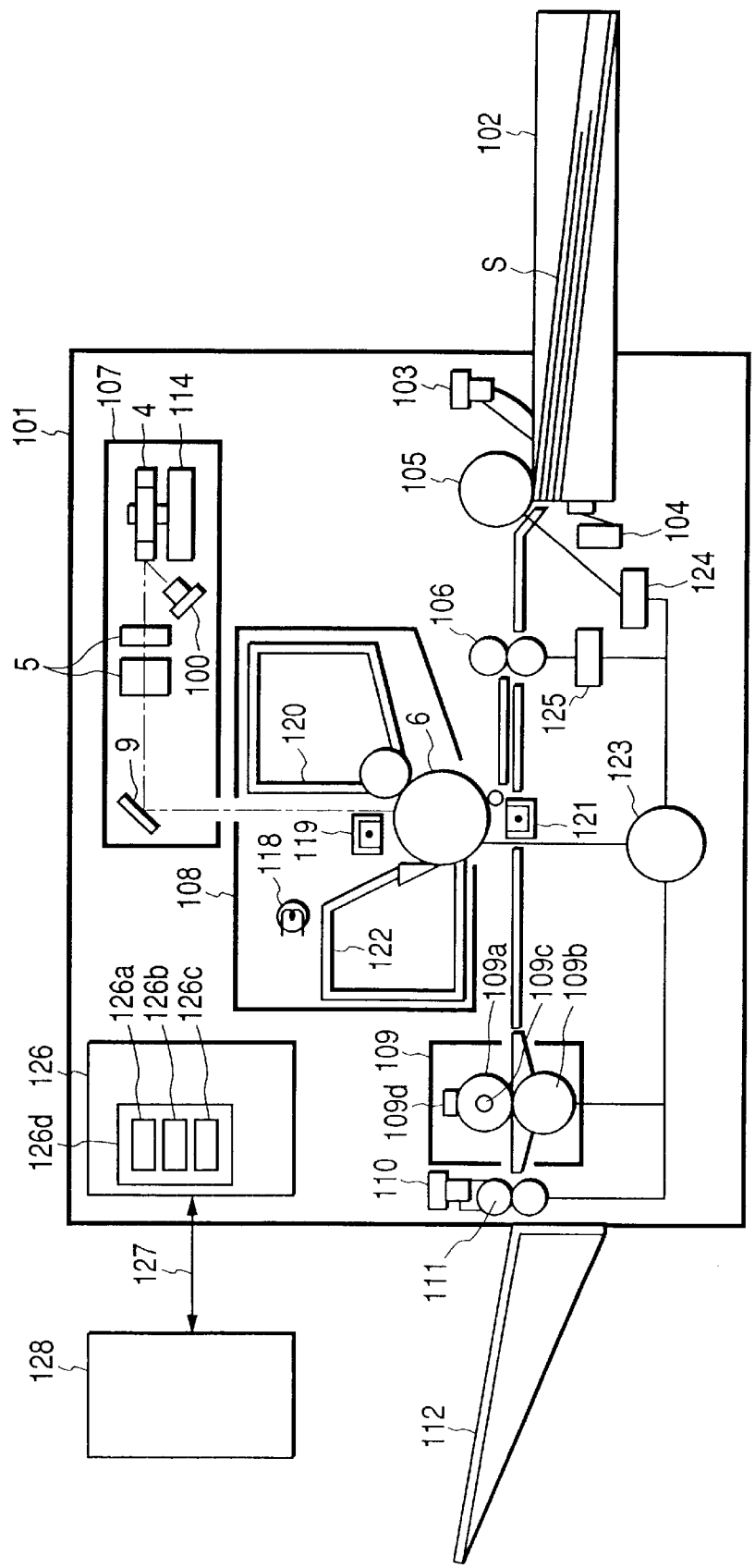
FIG. 2 is a sectional view showing the overall arrangement of an image forming apparatus according to the first embodiment of the present invention.

FIG. 2 is a sectional view for explaining the overall arrangement of an image forming apparatus according to the first embodiment of the present invention, and exemplifies a laser printer. The arrangement and operation of the apparatus will be explained below.

A laser printer main body 101 (to be referred to as a main body 101 hereinafter) has a cassette 102 for storing recording sheets S, and a cassette sheet sensor 103 for detecting the presence/absence of recording sheets S in the cassette 102, a cassette size sensor 104 (constituted by a plurality of microswitches) for detecting the size of recording sheets S in the cassette 102, a pickup roller 105 for picking up a recording sheet S from the cassette 102, and the like are placed around the cassette 102. A pair of registration rollers 106 for synchronously conveying a recording sheet S are located on the downstream of the pickup roller 105. An image forming unit 108 for forming a toner image on the recording sheet S on the basis of laser beams coming from a laser scanner unit 107 placed downstream the pair of registration rollers 106.

Furthermore, a fixing device 109 for thermally fixing the toner image formed on the recording sheet S is located downstream the image forming unit 108, and an exhaust sensor 110 for detecting the sheet convey state on an exhaust unit, exhaust rollers 111 for exhausting the recording sheet S, and a tray 112 for stacking recorded recording sheets S are placed downstream the fixing device 109.

The scanner unit 107 comprises a laser unit 100 for emitting a laser beam modulated on the basis of an image signal (image signal VDO) output from an external apparatus 128 (to be described later), a rotary polygonal mirror 4 for scanning the laser beam emitted by the laser unit 100 onto a photosensitive drum 6 (to be described later), a polygon motor 114, an imaging lens group 5, a return mirror 9, and the like. The image forming unit 108 comprises the photosensitive drum 6, a pre-exposure lamp 118, a primary charger 119, a developer 120, a transfer charger 121, a cleaner 122, and the like, which are required for the known electrophotography process. Also, the fixing device 109 comprises a heat roller 109a, compression roller 109b, halogen heater 109c included in the heat roller, and thermistor 109d for detecting the surface temperature of the heat roller.

A main motor 123 supplies a driving force to the pickup roller 105 via a pickup roller clutch 124 and to the pair of registration rollers 106 via a registration roller clutch 125, and also supplies a driving force to the respective units of the image forming unit 108 including the photosensitive drum 6, the fixing device 109, and the exhaust rollers 111. A printer controller 126 controls the main body 101, and is constructed by an MPU (microcomputer) 126d comprising a timer 126a, ROM 126b, RAM 126c, and the like, various I/O control circuits (not shown), and the like. Furthermore, the printer controller 126 is capable of communicating with an external apparatus 128 via an interface 127.

Figure 3:
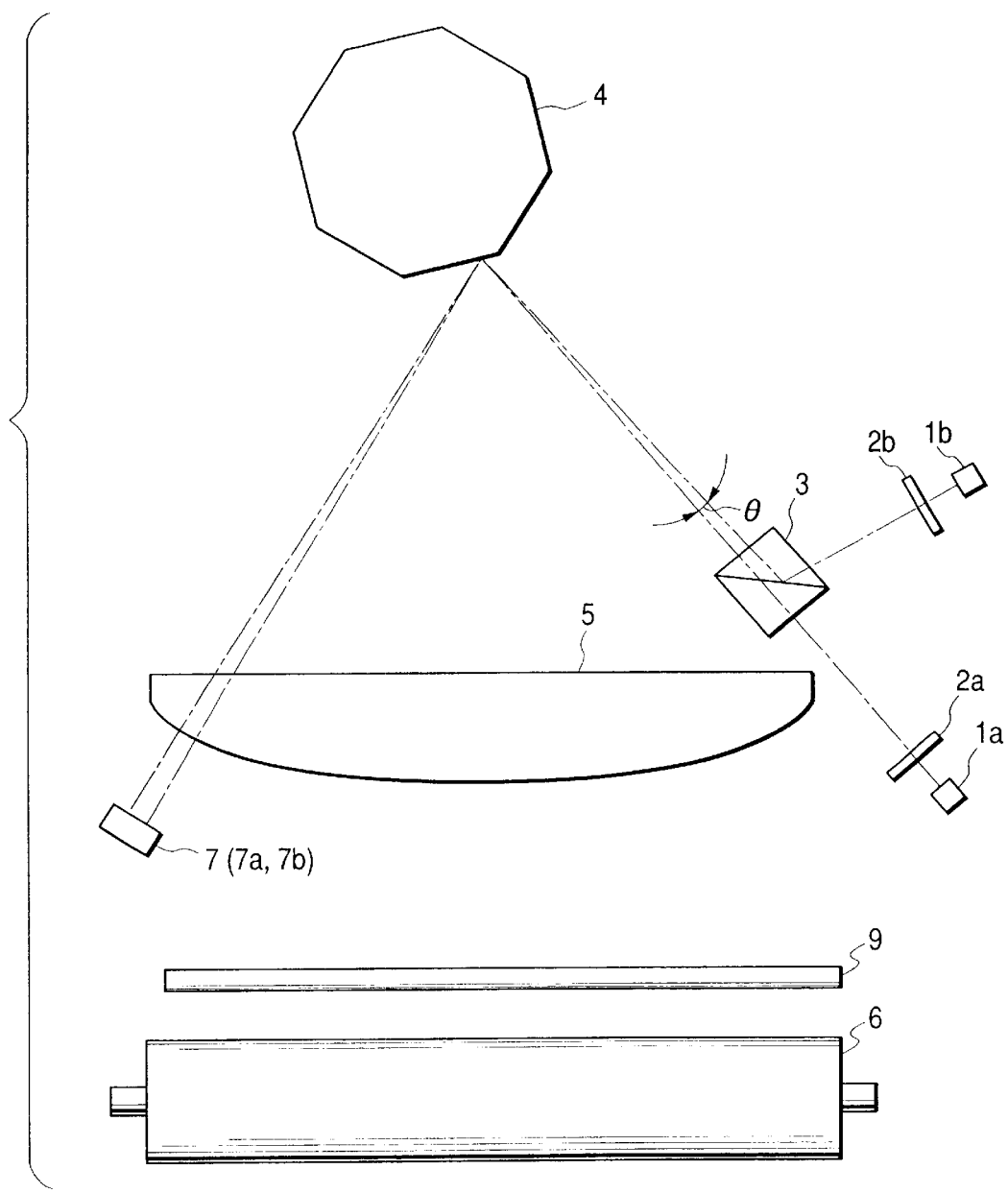
FIG. 3 is a plan view showing the arrangement of a scanner unit of the image forming apparatus according to the first embodiment of the present invention.

FIG. 3 is a plan view showing the arrangement of the scanner unit of the image forming apparatus according to the first embodiment of the present invention. Referring to FIG. 3, semiconductor lasers 1a and 1b serve as write light sources. The semiconductor lasers 1a and 1b are driven by a laser drive circuit (not shown) in accordance with an image signal, and emit laser beams which are modulated in accordance with the image signal. A laser beam emitted by the semiconductor laser 1a is converted into a collimated beam by a collimator lens (not shown), and enters a polarization beam splitter 3 via a cylindrical lens 2a. The polarization beam splitter 3 has characteristics for transmitting light coming from the semiconductor laser 1a but reflecting light coming from the semiconductor laser 1b. Hence, the laser beam coming from the semiconductor laser 1a is transmitted through the polarization beam splitter 3 and becomes incident on the rotary polygonal mirror 4. On the other hand, the laser beam emitted by the semiconductor laser 1b is converted into a collimated beam by the collimator lens (not shown), and is then reflected by the polarization beam splitter 3 via the cylindrical lens 2b. Then, the laser beam becomes incident on the rotary polygonal mirror 4.

The laser beams coming from the semiconductor lasers 1a and 1b are reflected by the rotary polygonal mirror 4, are deflected upon rotation of the rotary polygonal mirror 4, and scan the surface of the photosensitive drum 6 as a recording medium in the main scanning direction. Each laser beam reflected by the rotary polygonal mirror 4 is transmitted through the f-θ lens 5 constructed by one or a plurality of lenses, is reflected by the reflection mirror 9, and then hits the photosensitive drum 6. The positions of the two laser beams from the semiconductor lasers 1a and 1b in the main scanning direction are displaced by a predetermined distance in the sub-scanning direction of the photosensitive drum 6. The laser beams from the semiconductor lasers 1a and 1b become incident on the rotary polygonal mirror 4 while being shifted by an angle θ, and spots of the laser beams are shifted by a distance fθ=ΔA on the surface to be scanned of the photosensitive drum 6.

Note that the same applies to a case wherein an integrated semiconductor laser unit in which two semiconductor lasers emit laser beams that are initially shifted by the angle θ, or a case wherein an integrated semiconductor laser unit having two semiconductor lasers is used, and the emitted laser beams are deflected to be shifted by the angle θ using a lens and the like. The positional relationship between the two spots formed by the two semiconductor lasers 1a and 1b will be described in detail later.

In this embodiment, a photodetection element 7 for detecting the two spots reflected by the rotary polygonal mirror 4 in turn is placed on the start point side of the two laser beams in the main scanning direction. The photodetection element 7 comprises two light-receiving elements which are juxtaposed in the main scanning direction (or a 2-split photodetection element which is split in the sub-scanning direction may be used). As these light-receiving elements, photodetectors are used. The two laser beams reflected by the rotary polygonal mirror 4 are detected by the two light-receiving elements of the photodetection element 7 prior to scanning in the main scanning direction. As will be described in detail later, the output signals from the two light-receiving elements are compared by comparison circuits to output a timing signal indicating a reference position of the two spots. Using this timing signal, the write start positions of the two spots in the main scanning direction are synchronized.

Figure 4:
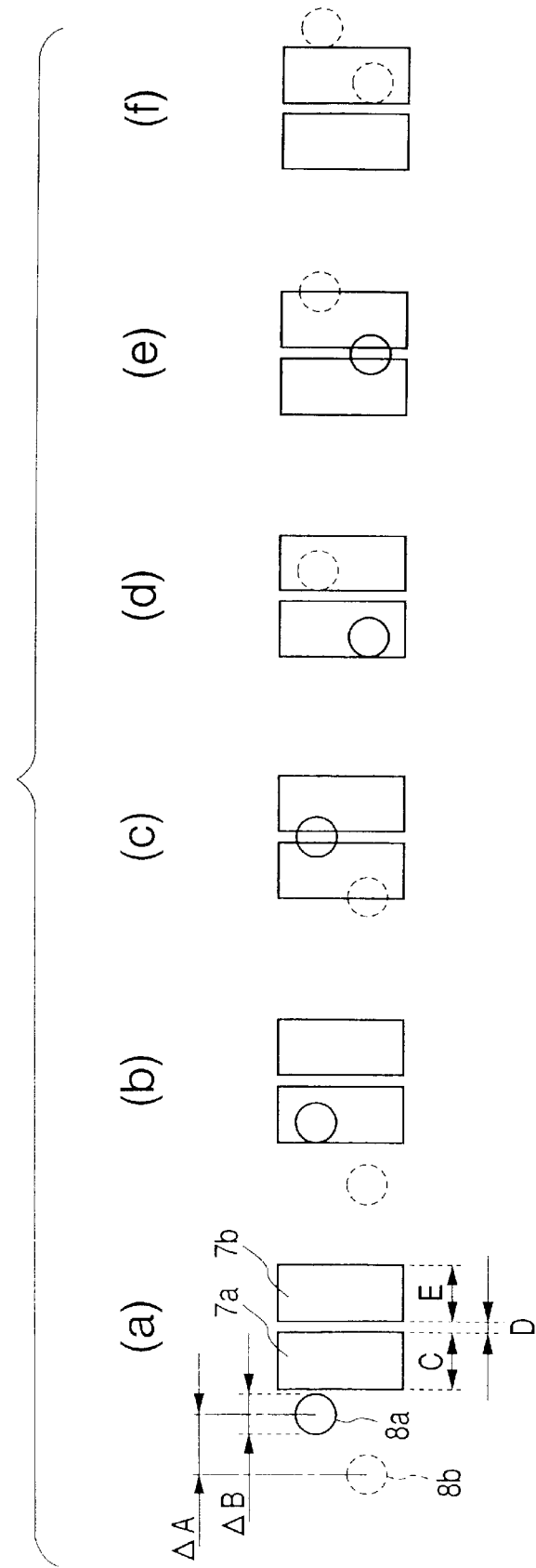
FIG. 4 is a view showing how two write spots of the embodiment shown in FIG. 3 pass on two photodetection elements juxtaposed in the main scanning direction.

FIG. 4 shows how the two spots formed by the two laser beams from the semiconductor lasers 1a and 1b pass on the photodetection element 7 upon rotation of the rotary polygonal mirror 4. Referring to FIG. 4, spots 8a and 8b are respectively formed by the semiconductor lasers 1a and 1b. To restate, the photodetection element 7 is comprised of light-receiving elements 7a and 7b juxtaposed in the main scanning direction. A spacing D between the two light-receiving elements 7a and 7b satisfies ΔB>>D to become sufficiently smaller than the diameter ΔB of each of the spots 8a and 8b. The two spots 8a and 8b are shifted by ΔA in the main scanning direction, as described above, and the spot spacing ΔA in the main scanning direction satisfies ΔA≧ΔB to be larger than the spot diameter ΔB. Furthermore, widths C and E of the two light-receiving elements 7a and 7b of the photodetection element 7 in the main scanning direction respectively satisfy C≧ΔB and E≧ΔB to be larger than the spot diameter ΔB.

The spots 8a and 8b formed by the semiconductor lasers 1a and 1b are scanned to pass the surface of the photodetection element 7 in (a), (b), (c), (d), (e), and (f) of FIG. 4. In this embodiment, when the two spots 8a and 8b pass the surface of the photodetection element 7, they are turned on in the order from the leading spot, and the reference timings of the two spots are detected time-divisionally. This will be described in detail later. Of the two spots 8a and 8b in FIG. 4, the solid spot indicates ON, and the broken spot OFF.

Figure 5:
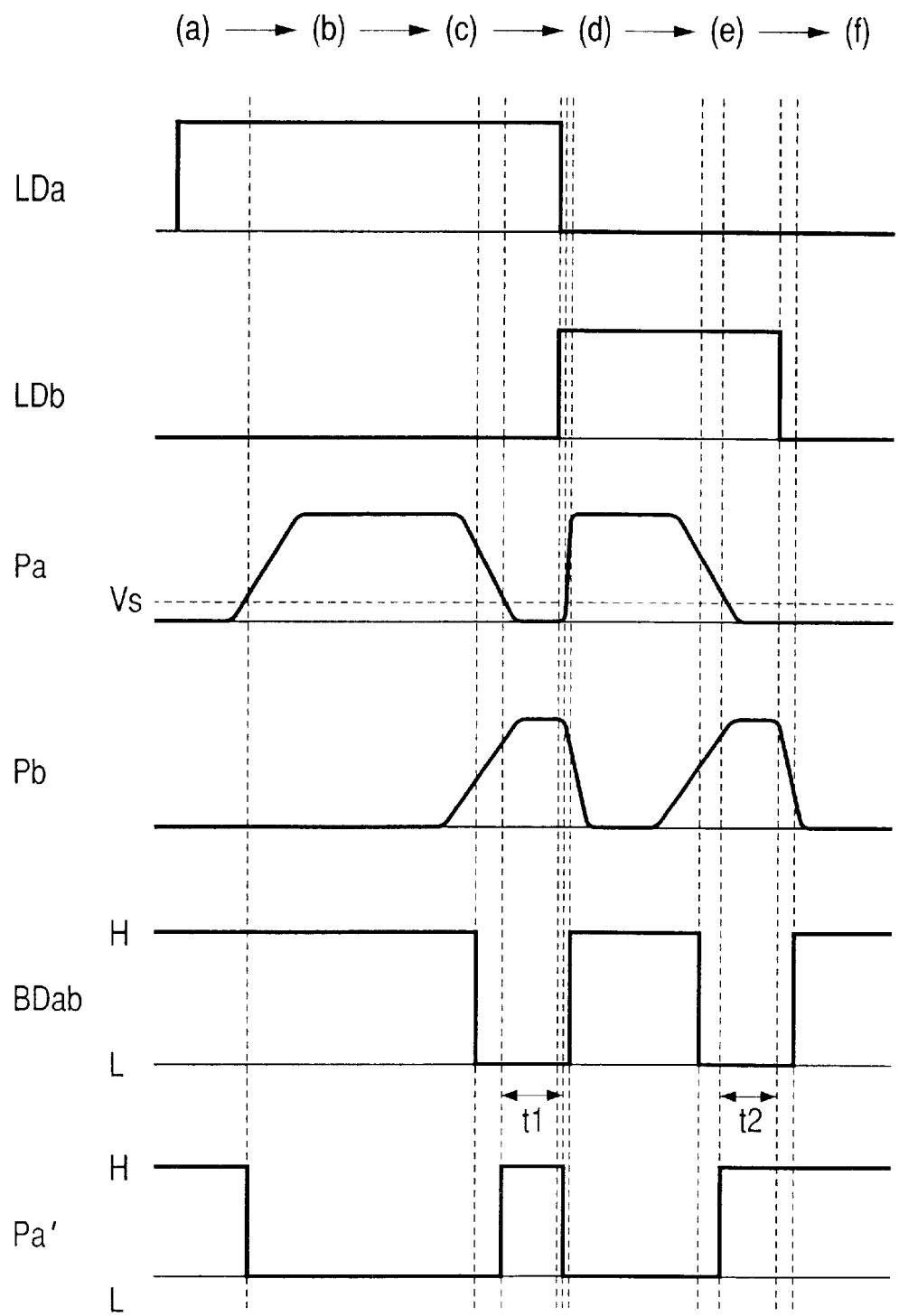
FIG. 5 is a chart showing signals of the respective unit when the two spots pass through the two photodetection elements.

FIG. 5 shows signals of the respective units when the two spots 8a and 8b pass the surface of the photodetection element 7, as shown in FIG. 4. FIG. 5 shows an output signal Pa from the light-receiving element 7a, an output signal Pb from the light-receiving element 7b, and output signals BDab and Pa' from comparison circuits. The timings of (a) to (f) in FIG. 5 respectively correspond to (a) to (f) in FIG. 4, and signals at the timings of (a) to (f) in FIG. 5 indicate those at the two spot positions in (a) to (f) in FIG. 4.

Figure 6:
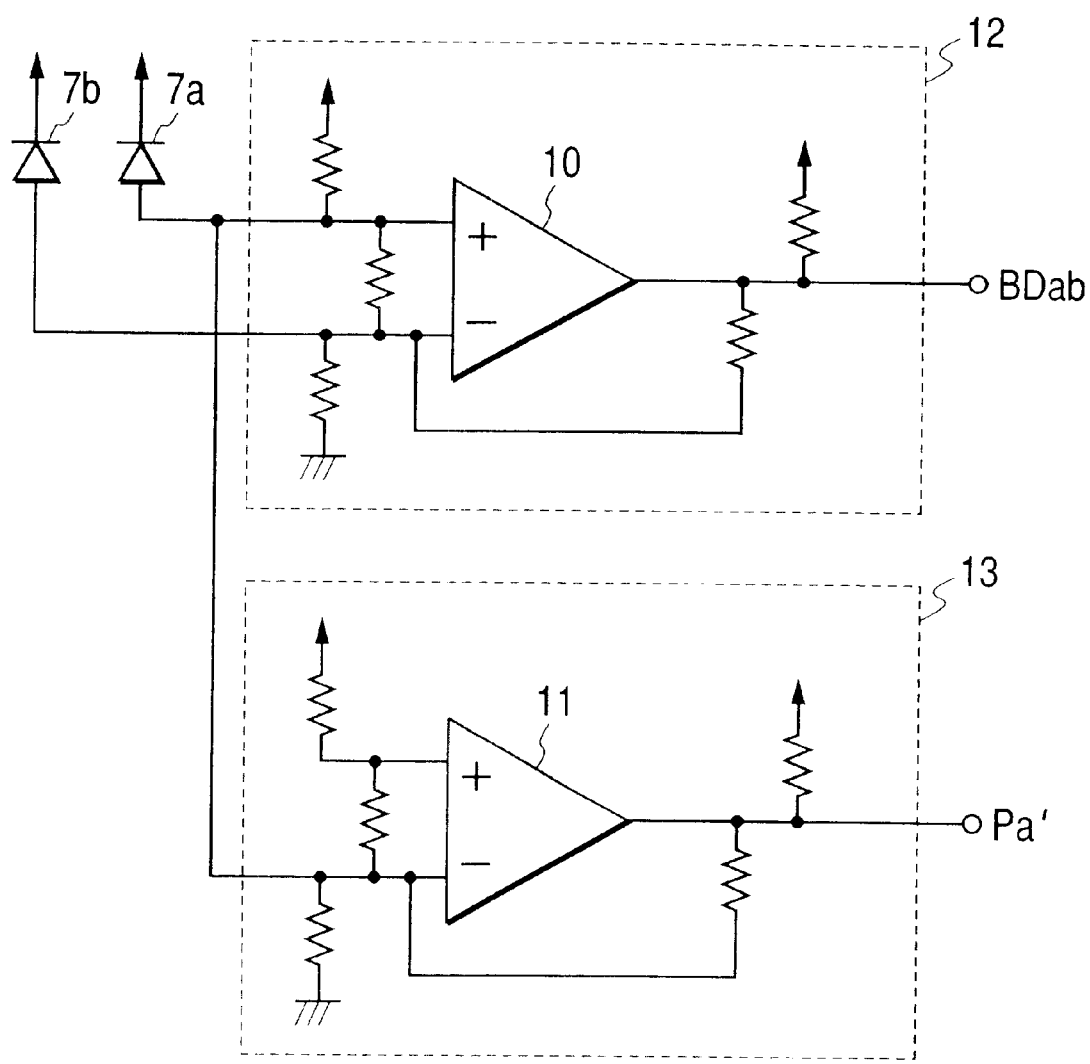
FIG. 6 is a circuit diagram showing an example of comparison circuits used in the embodiment shown in FIG. 3.

FIG. 6 shows an example of the comparison circuits. The output signals from the light-receiving elements 7a and 7b are compared by comparators 10 and 11, and their comparison outputs are output to the controller (printer controller) 126 in the apparatus. In a comparison circuit 12 shown in FIG. 6, when the output voltage from the light-receiving element 7a is higher than that from the light-receiving element 7b, the output signal changes to low level, and is input to a separation circuit shown in FIG. 7. In a comparison circuit 13, when the output voltage from the light-receiving element 7a is higher than a predetermined voltage Vs, an output signal Pa' changes to low level, and is input to the separation circuit shown in FIG. 7.

The operation of this embodiment will be described in detail below. The operations of the two semiconductor lasers, light-receiving elements, and comparison circuits will be described in detail with reference to FIGS. 4, 5, and 6. When the light beams emitted by the two semiconductor lasers 1a and 1b begin to be scanned in the main scanning direction, the controller 126 turns on the semiconductor laser 1a of the leading spot 8a of the two semiconductor lasers 1a and 1b by setting its drive signal LDa (shown in FIG. 5) at high level, and turns off the other semiconductor laser 1b by setting its drive signal LDb (shown in FIG. 5) at low level.

In state (a) in FIG. 4, the two spots 8a and 8b begin to be scanned in the main scanning direction, and are about to reach the photodetection element 7. In state (a) in FIG. 4, since the leading spot 8a has not reached the light-receiving element 7a and the other spot 8b is OFF, the output voltages from both the light-receiving elements 7a and 7b are 0 level, as indicated by Pa and Pb in FIG. 5. Also, the output signal from the comparison circuit 12 is high level, as indicated by BDab in FIG. 5. When the leading spot 8a has reached the light-receiving element 7a as in state (b) in FIG. 4, the output signal from the light-receiving element 7a changes in correspondence with the light amount of the spot 8a, as indicated by Pa in FIG. 5, and the signal from the other light-receiving element 7b is 0 level, as indicated by Pb in FIG. 5, since the spot 8b is OFF. The output from the comparison circuit 12 is high level, as indicated by BDab in FIG. 5.

When the leading spot 8a has reached the middle position between the two light-receiving elements 7a and 7b as in state (c) in FIG. 4, the output signals from the two light-receiving elements 7a and 7b become equal to each other, as indicated by Pa and Pb in FIG. 5, and the output signal from the comparison circuit 12 is inverted from high level to low level, as indicated by BDab in FIG. 5. That is, in this embodiment, the middle position between the light-receiving elements 7a and 7b is set to be a reference position, and when the leading spot 8a has reached the middle reference position between the light-receiving elements 7a and 7b as in state (c) in FIG. 4, the comparison circuit 12 outputs a low-level signal indicating that the leading spot has reached the reference position. This low-level signal is used as a reference timing signal for the leading spot 8a. When the output signal Pa' from the comparison circuit 13 changes to high level, the controller 126 turns off the semiconductor laser 1a of the leading spot 8a, and turns on the semiconductor laser 1b of the trailing spot 8b.

In this state, when the trailing spot 8b has reached the light-receiving element 7a as in state (d) in FIG. 4, the output voltage from the light-receiving element 7a changes in correspondence with the light amount of the spot 8b, as indicated by Pa in FIG. 5, and the voltage of the light-receiving 7b becomes 0 level, as indicated by Pb in FIG. 5, since the leading spot is OFF. The output from the comparison circuit 12 is inverted to high level, as indicated by BDab in FIG. 5. When the trailing spot 8b has reached the middle position between the light-receiving elements 8a and 8b as in state (e) in FIG. 4, the output signals from the two light-receiving elements 7a and 7b become equal to each other, as indicated by Pa and Pb in FIG. 5, and the output signal from the comparison circuit 12 is inverted from high level to low level, as indicated by BDab in FIG. 5. That is, when the trailing spot 8b has reached the middle reference position between the light-receiving elements 7a and 7b as in state (e) in FIG. 4, the comparison circuit 12 outputs a low-level signal indicating that the trailing spot 8b has reached the reference position. This low-level signal is similarly used as a reference timing signal for the trailing spot 8b.

When the output from the comparison circuit 13 changes to low level, the controller 126 turns off the semiconductor laser 1b to end a series of detection processes of the reference timings of the two spots 8a and 8b in the main scanning direction. In state (f) in FIG. 4, both the spots 8a and 8b are OFF. In this state, the output signals from the light-receiving elements 7a and 7b are 0 level, as indicated by Pa and Pb in FIG. 5, and the output from the comparison circuit 12 is high level, as indicated by BDab in FIG. 5.

Figure 7:
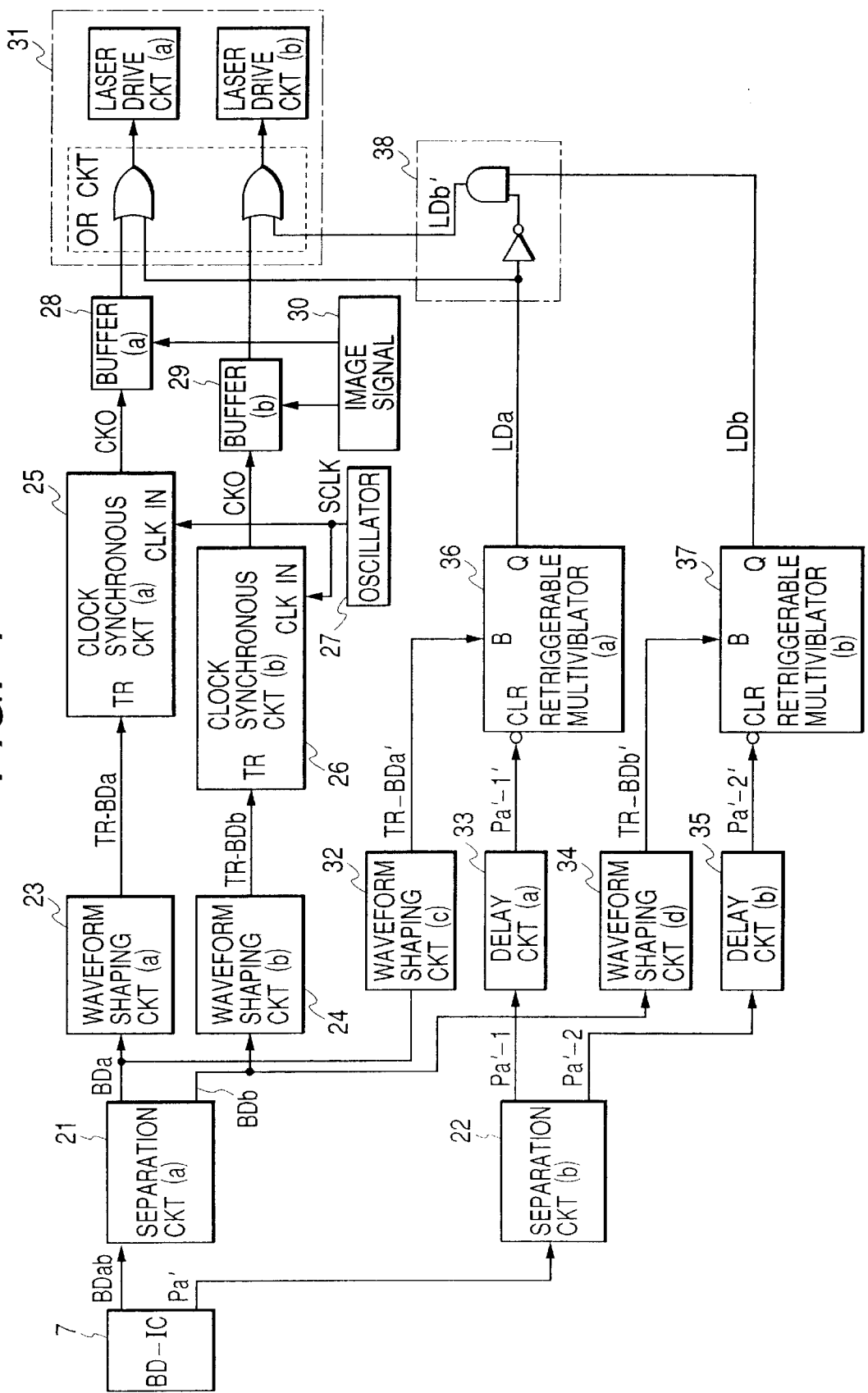
FIG. 7 is a block diagram showing a control circuit for ON/OFF-controlling the two spots when they pass through the two photodetection elements.
Figure 8:
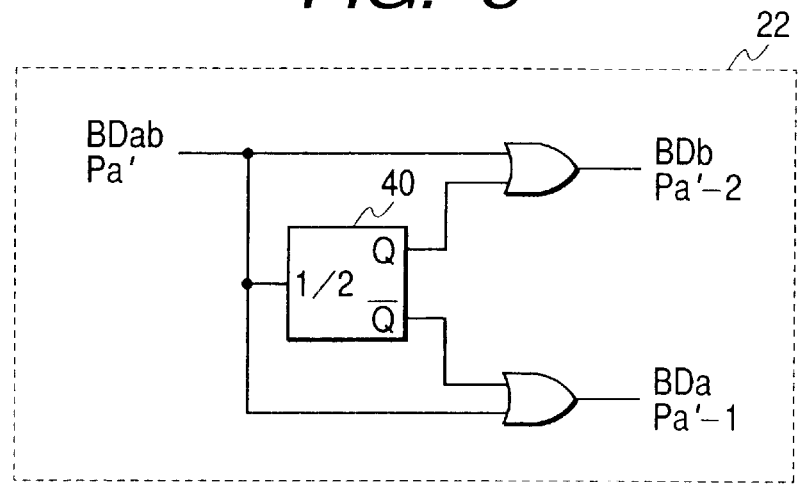
FIG. 8 is a circuit diagram showing an example of a separation circuit used in the embodiment shown in FIG. 3.
Figure 9:
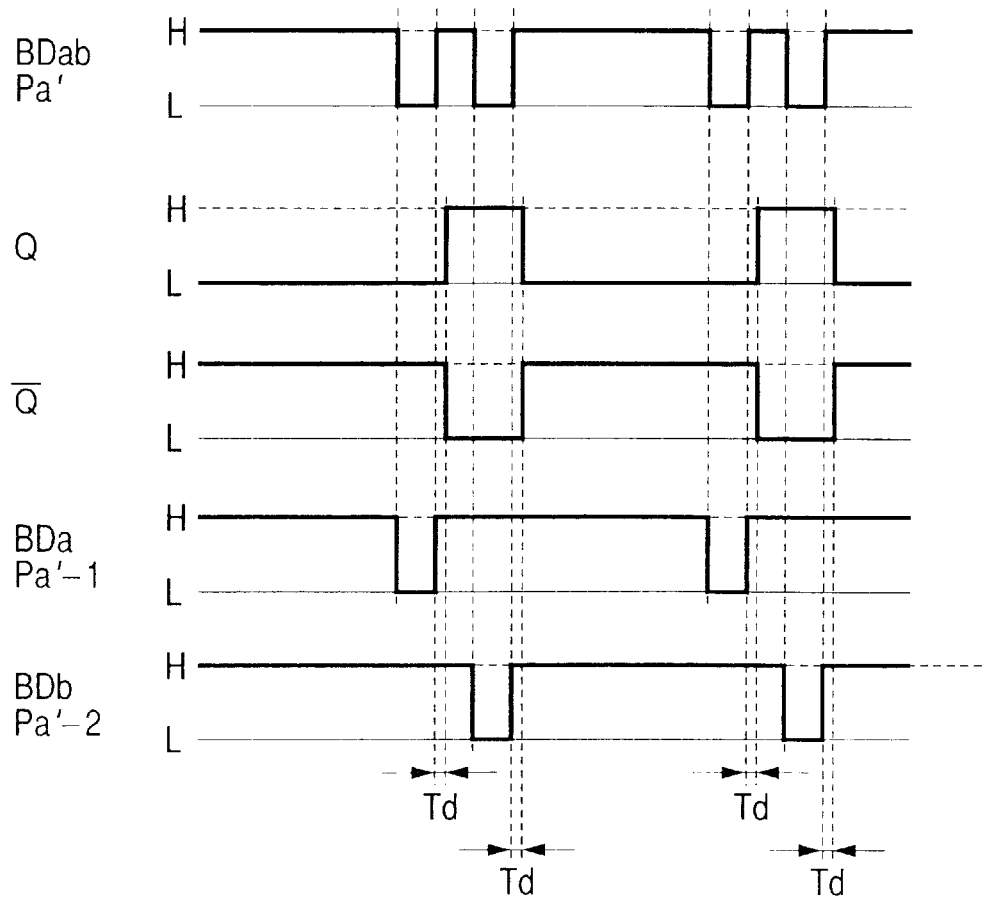
FIG. 9 is a chart showing signal separation of the separation circuit shown in FIG. 8.

FIG. 7 is a block diagram showing an example of a circuit for synchronizing the drive and write start timings of the two semiconductor lasers. The reference position signal Bdab of the two laser spots is input to a separation circuit (a) 21 in FIG. 7, and is separated into a reference position signal BDa for the leading laser 1a and a reference position signal BDb for the trailing laser 1b. For example, the separation circuit is constructed by a frequency divider, and the like, as shown in FIG. 8, and separates a signal, as shown in FIG. 9. A time Td shown in FIG. 9 indicates the operation delay time of a frequency divider 40. The signal BDa is input to waveform shaping circuits (b) 23 and (c) 32, and the signal BDb is input to waveform shaping circuits (b) 24 and (d) 34. For example, the waveform shaping circuit comprises a timer counter, and outputs a high-level signal a predetermined period of time after it received a low-level signal.

Figure 10:
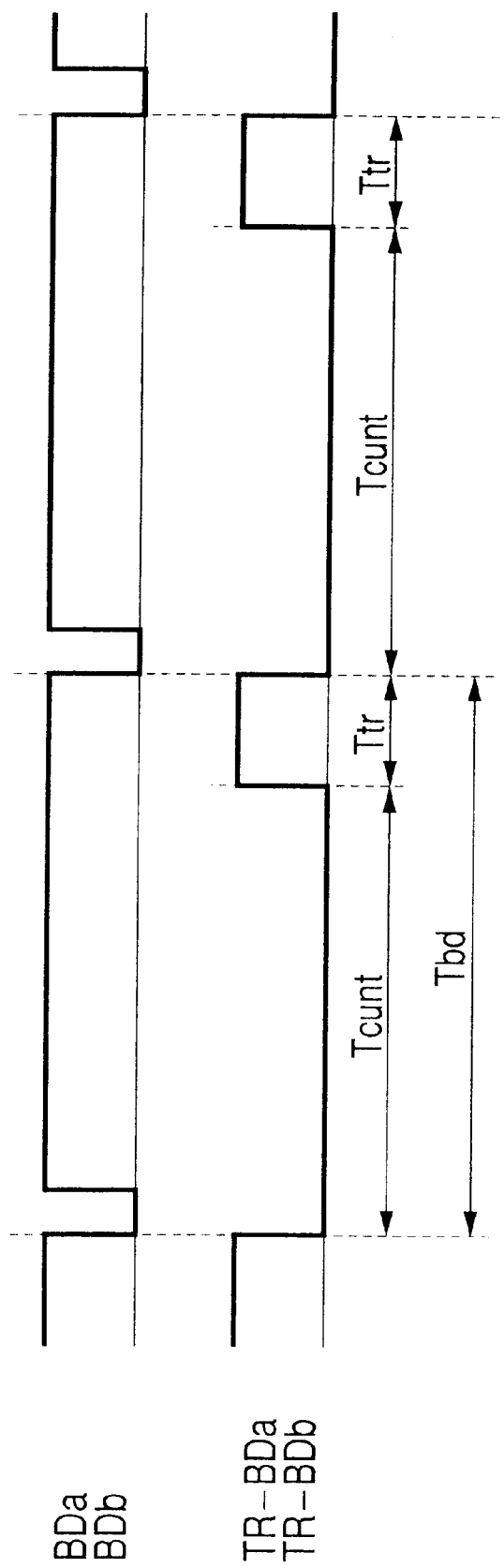
FIG. 10 is chart showing input/output signals of a waveform shaping circuit shown in FIG. 7.

FIG. 10 shows the waveforms of the input signals BDa and BDb and output signals TR-BDa and TR-BDb of the waveform shaping circuits (a) 23 and (b) 24. Each of the waveform shaping circuits (a) 23 and (b) 24 sets the signal at high level after an elapse of a predetermined time Tcount to generate a high-level time Ttr within a known one main scanning time Tbd. The output signals TR-BDa and TR-BDb are respectively input to clock synchronous circuits (a) 25 and (b) 26.

For example, each of the clock synchronous circuits (a) 25 and (b) 26 comprises M66235FP available from Mitsubishi Electric Corp., and a reference clock SCLK of an image signal output from an oscillator 27 is input to the CLKIN terminals of the clock synchronous circuits (a) 25 and (b) 26. The clock synchronous circuits (a) 25 and (b) 26 respectively lock the phase of the reference clock SCLK of an image signal to that of the reference position signals BDa and BDb, and output locked clocks. In these circuits, the signals TR-BDa and TR-BDb serve as trigger input signals, and the phases are locked in response to their trailing edges.

Figure 11:
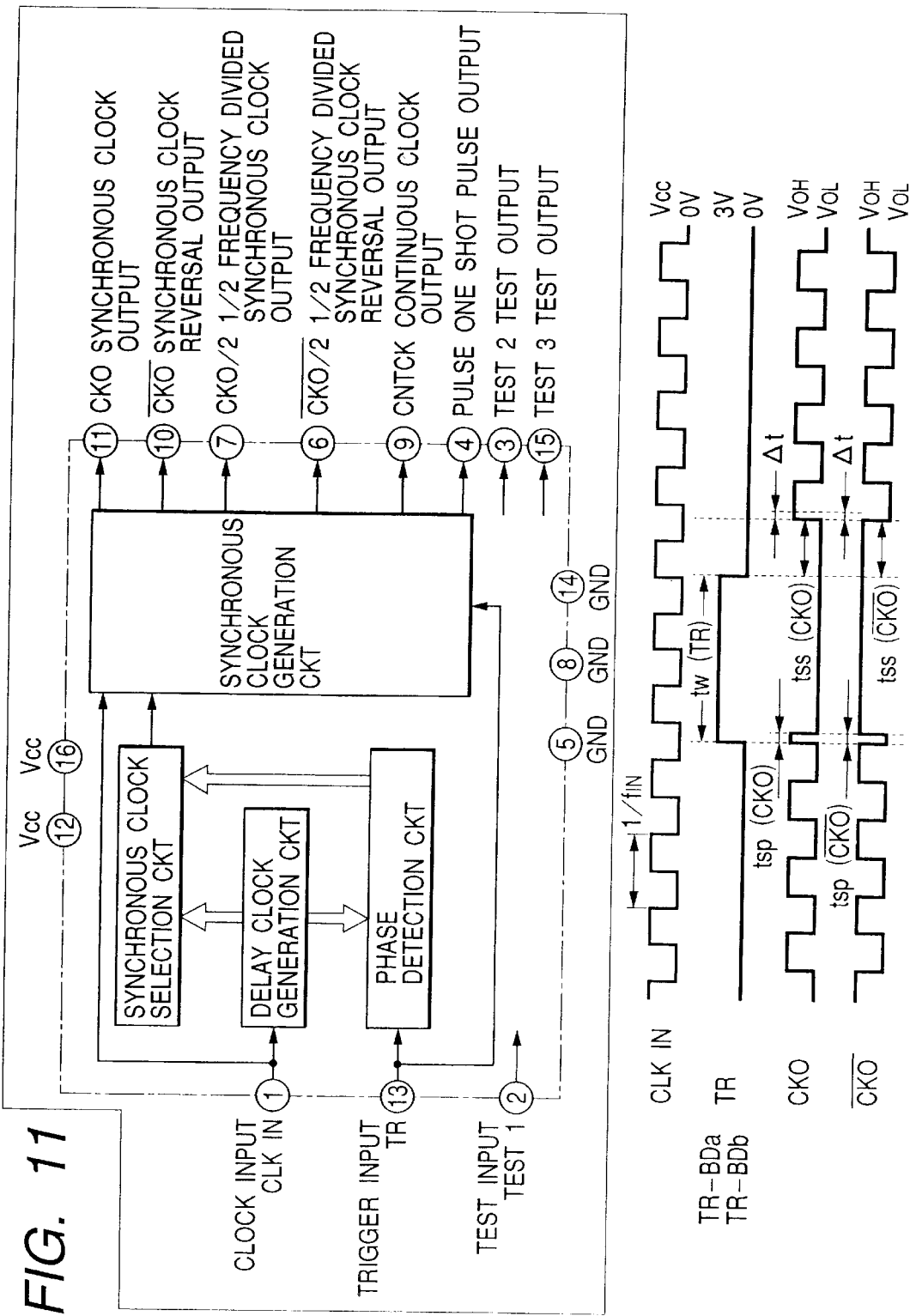
FIG. 11 is a diagram and chart showing input/output signals of a clock synchronous circuit (M66235FP available from Mitsubishi Electric Corp.)

FIG. 11 shows a schematic block diagram of M66235FP available from Mitsubishi Electric Corp. and its input/output signals. Since the signals TR-BDa and TR-BDb are input to the TR terminals of the clock synchronous circuits (a) 25 and (b) 26, the aforementioned time Ttr satisfies Ttr≧200 ns. For this reason, the time Tcount is set at a value that satisfies Tcount≦Tbd−200 ns. The locked clocks CKO (or/CKO) are respectively input to buffers (a) 28 and (b) 29, which respectively supply an image signal 30 stored in, e.g., a line buffer to corresponding laser drive circuits in synchronism with the clocks. With this image signal, an image is formed.

Figure 12:
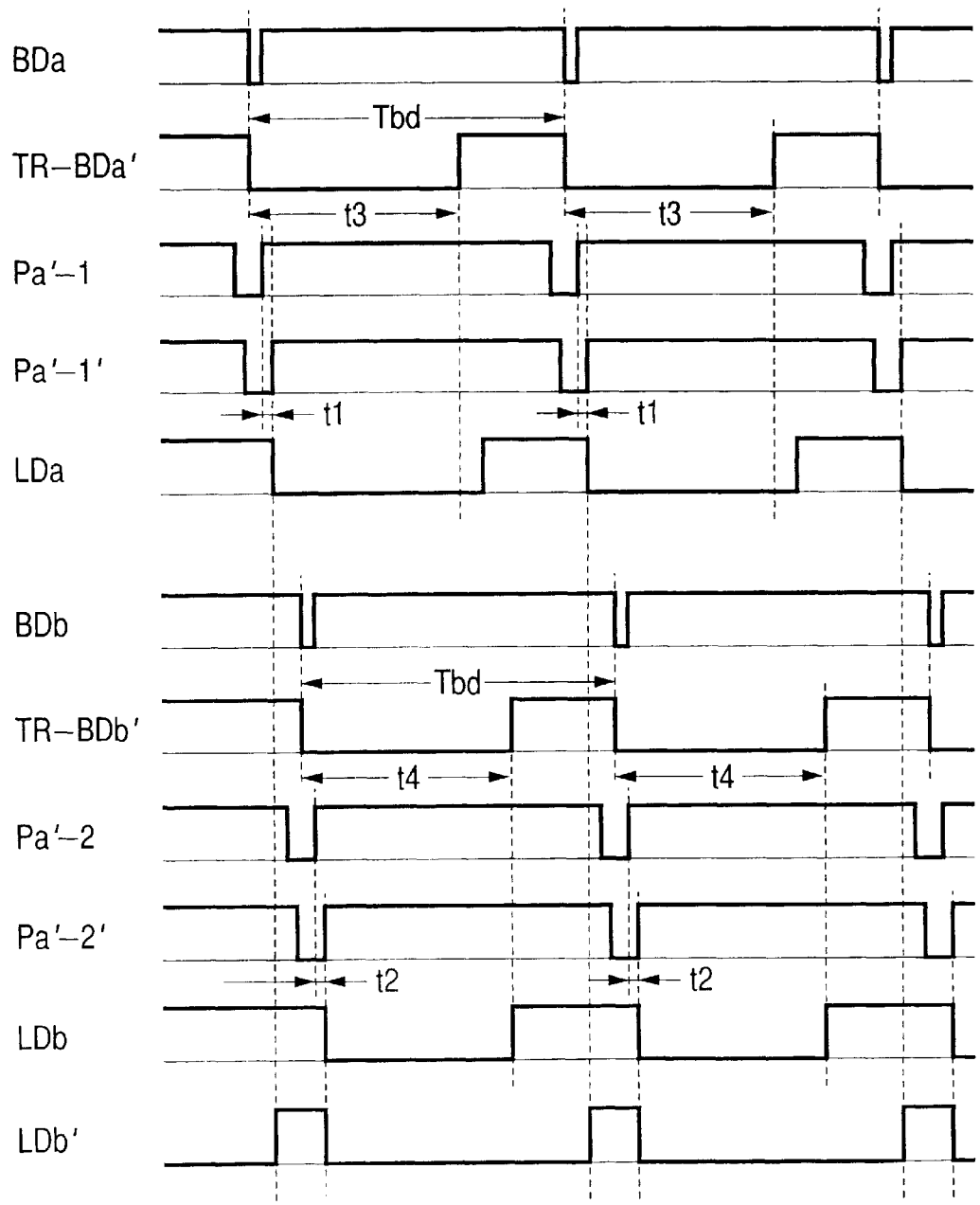
FIG. 12 is a chart showing signals of the respective units in the embodiment shown in FIG. 3.

FIG. 12 shows the states of the drive signals for the lasers 1a and 1b upon detection of the reference positions. The reference position signals BDa and BDb input to the waveform shaping circuits (c) 32 and (d) 34 are converted into drive trigger signals for drive signals LDa and LDb for turning on the lasers 1a and 1b, and are input to retriggerable multivibrators (a) 36 and (b) 37. In these trigger signals, t3 and t4 are set to satisfy Tg<t3 and t4<Tbd on the basis of a predetermined time Tg required until the main scan exceeds the image area on the photosensitive drum 6, and a predetermined one scanning time Tbd. If t3 or t4 <Tbd−200 ns, the waveform shaping circuits (a) 23 and (c) 32 can be constructed by a common circuit, and the waveform shaping circuits (b) 24 and (d) 34 can also be constructed by a common circuit.

The signal Pa' generated based on the output voltage from the light-receiving element 7a and the threshold voltage Vs is separated by a separation circuit 22 shown in FIG. 8 into signals Pa'-1 and Pa'-2, which are respectively input to delay circuits (a) 33 and (b) 35 to be converted into signals Pa'-1' and Pa'-2' delayed by times t1 and t2. The signals Pa'-1' and Pa'-2' are input to the retriggerable multivibrators (a) 36 and (b) 37 as reset signals, i.e., OFF timing trigger signals for the lasers 1a and 1b. The outputs from the retriggerable multivibrators (a) 36 and (b) 37 become the drive signals LDa and LDb for turning on the lasers 1a and 1b.

The delay times t1 and t2 of the delay circuits (a) 33 and (b) 35 assure the signal duration (low-level time) of the signal BDab, as shown in FIG. 5, and satisfy t1 or t2≧0 (if t1 or t2=0, the delay circuits are not necessary). The drive signal LDb for the trailing laser 1b is gated by a gate circuit 38 to be converted into a drive signal LDb', so that it is turned on only when the drive signal LDa for the leading laser 1a is OFF, and the signal LDb' is supplied to a drive circuit 31 for the laser 1b. In this way, the laser ON timing for detecting the next reference position is generated. By assuring such delay times, when the leading spot 8a nearly falls outside the light-receiving element 7a, the laser 1a is turned off.

Figure 13:
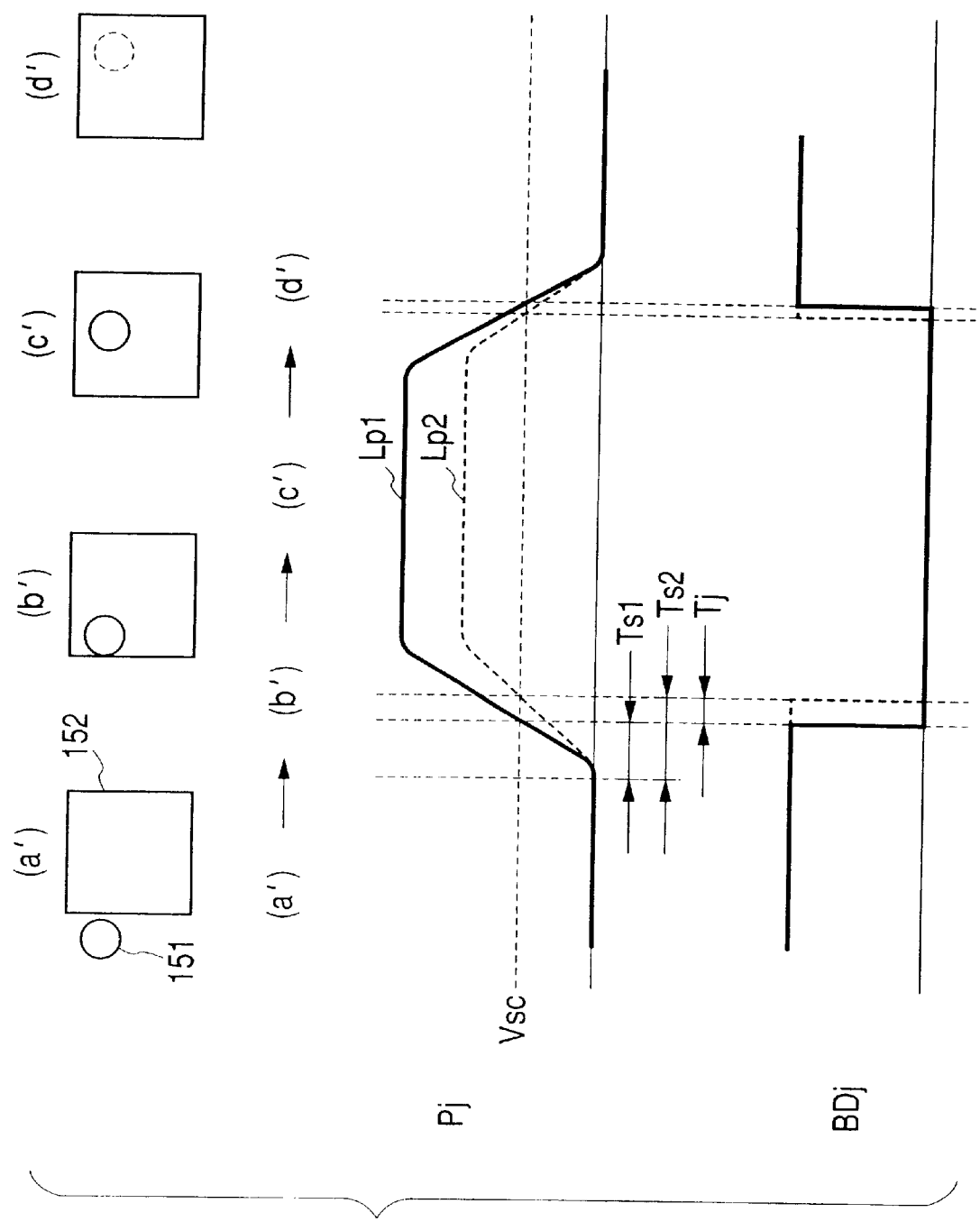
FIG. 13 is a view showing the conventional detection process using a single photodetection element.
Figure 14:
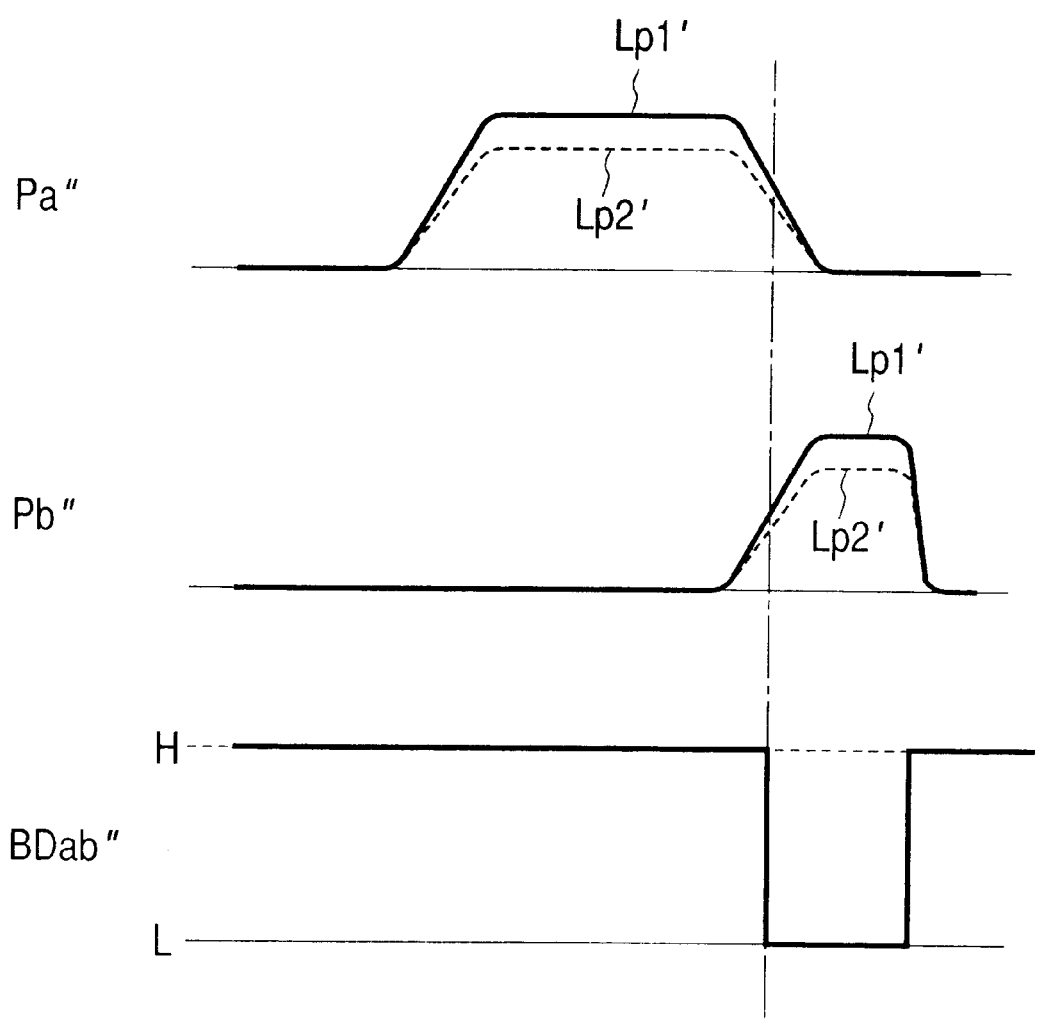
FIG. 14 is a chart showing a case in which the laser beam amounts are different in the embodiment shown in FIG. 3.

In this embodiment, since the two spots are detected by the two light-receiving elements juxtaposed in the main scanning direction, and the reference timings of the two spots are detected on the basis of the output signals from the two light-receiving elements, no polarization beam splitter is required unlike in the conventional apparatus, and the arrangement can be simplified. In an arrangement as shown in FIG. 13 in which a laser spot 151 is detected by a single light-receiving element 152, and a reference position is detected on the basis of a prescribed threshold value Vsc when the laser light amount varies, the output voltage from the light-receiving element varies like LP1 and LP2 due to different light amounts, the time until the threshold voltage Vsc is reached also varies like Ts1 and Ts2, and a time Tj=Ts2−Ts1 is produced. Hence, when the light amount varies, the time Tj becomes the deviation component of the reference timing, resulting in poor positional precision.

In view of this problem, in this embodiment, even when the laser light amount varies and the output from one light-receiving element varies like LP1' and LP2', since the reference timing is detected by comparing the output signals from the two light-receiving elements, an accurate reference timing can be obtained independently of changes in light amount of each of the two spots. Therefore, the write start positions of the two spots in the main scanning direction can be accurately aligned, thus obtaining a high-precision recorded image.

Furthermore, in this embodiment, the mounting positions of the two light-receiving elements 7a and 7b need only be adjusted. Especially, when the two light-receiving elements 7a and 7b are formed on an IC, since the positional deviation between the two light-receiving elements remains the same, adjustment can be greatly simplified as compared to the conventional apparatus. Since the reference timings of the two spots in the main scanning direction are detected using one signal line, the controller need only have one input port.

Figure 15:
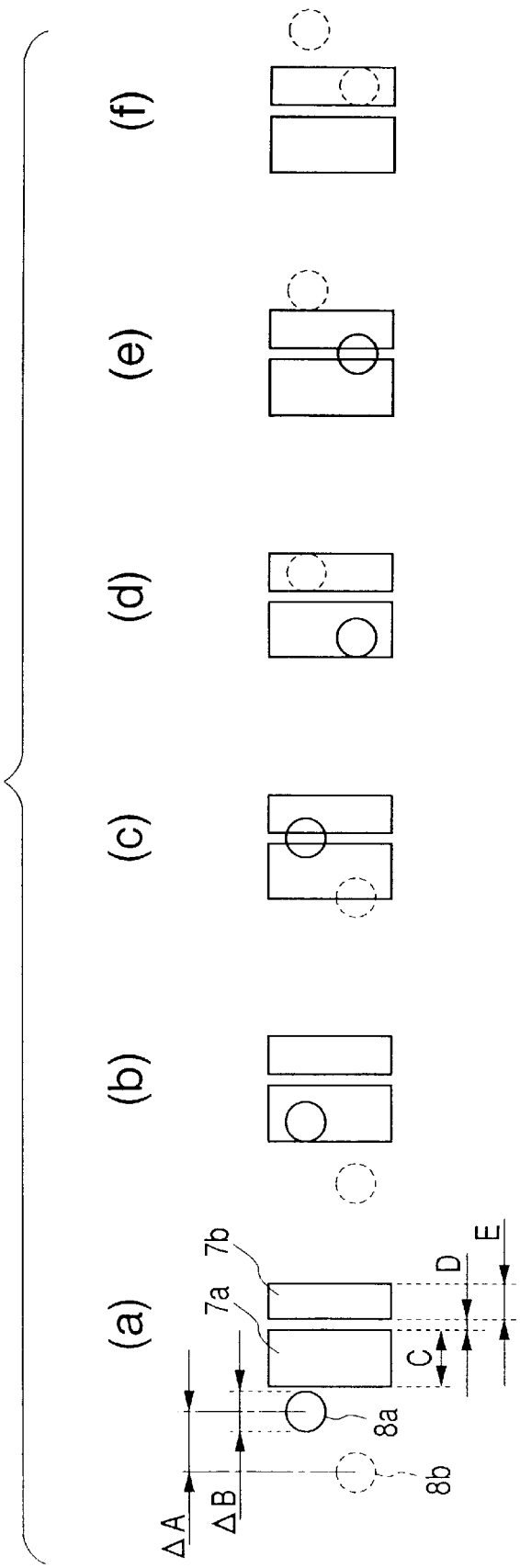
FIG. 15 is a view for explaining another embodiment of the present invention.
Figure 16:
FIG. 16 is a chart showing signals of respective units in the embodiment shown in FIG. 15.

Another embodiment of the present invention will be described below. In this embodiment, as shown in FIG. 15, the width of the light-receiving element 7b is set to be smaller than that of the light-receiving element 7a to satisfy C>E. FIG. 15 shows how the two spots 8a and 8b pass on the surface of the photodetection element 7 in states (a) to (f), as in FIG. 4. The solid spot indicates ON, and the broken spot OFF. FIG. 16 shows signals of the respective units upon passage of the two spots on the surface of the photodetection element, as shown in FIG. 15. FIG. 16 shows an output signal (X) from the light-receiving element 7a, an output signal (Y) from the light-receiving element 7b, and an output signal (Z) from the comparison circuit. The output signal from the light-receiving element 7b rises earlier since the element 7b has a smaller area. However, the reference timings of the spots 8a and 8b in the main scanning direction can be accurately detected as in the above embodiment. Also, since the area of the light-receiving element 7b is reduced, the photodetection element can be reduced in size, and a cost reduction can be attained accordingly.

In the above embodiments, the two spots 8a and 8b are simultaneously scanned on the photosensitive drum in the main scanning direction. Also, the present invention can be used when three or more spots are simultaneously scanned. For example, when three spots are simultaneously scanned, a third spot is scanned after the spot 8b in FIG. 4 to have the same positional relationship between the spots 8a and 8b. After the reference timing of the spot 8b is detected, the third spot can be turned on. In this manner, when the third spot has reached the middle position between the light-receiving elements 7a and 7b, a reference timing signal indicating that the third spot has reached the reference position can be obtained from the output of the comparison circuit.

To recapitulate, according to the present invention, not only the arrangement can be simplified, but also, position adjustment of the optical elements can be greatly facilitated as compared to the conventional apparatus. Also, since the reference timings of the spots are output by comparing the signals from the two light-receiving elements, even when the amount of the laser beam that becomes incident on each light-receiving element varies due to variations in reflectance and contaminations of the respective reflection surfaces of the rotary polygonal mirror, the reference timing signal can be accurately output irrespective of changes in light amount. Therefore, the write start positions of a plurality of spots in the main scanning direction can be accurately synchronized, and a high-precision recorded image can be obtained.

By "substantially middle position between the two light-receiving elements" is here meant the middle position of the distance D where the two light-receiving elements are disposed at the interval "D" as shown in FIG. 4, or the boundary position between the two light-receiving elements where the two lightreceiving elements are disposed adjacently each other.

What is claimed is:

1. A laser beam scanning apparatus comprising:
    a first laser source for emitting a first laser beam;
    a second laser source for emitting a second laser beam;
    deflecting means for deflecting the first and second laser beams emitted from said first and second laser sources;
    two light-receiving elements for receiving the first and second laser beams deflected by said deflecting means, said two light-receiving elements being juxtaposed in a main scanning direction; and
    control means for controlling laser beam emission timings of said first and second laser sources,
    wherein the laser beam emission timing of said first laser source is controlled on the basis of a timing when the first laser beam has reached a middle position between said two light-receiving elements and the laser beam emission timing of said second laser source is controlled on the basis of a timing when the second laser beam has reached the middle position, such that said second laser source is off when the first laser beam reaches the middle position and said first laser source is off when the second laser beam reaches the middle position.

2. A laser beam scanning apparatus according to claim 1, wherein said control means deems that the laser beam has reached the middle position when said two light-receiving elements show a same output level.

3. A laser beam scanning apparatus according to claim 1, wherein said second laser source is off until the first laser beam reaches the middle position and thereafter said first laser source is turned off and said second laser source is turned on.

4. A laser beam scanning apparatus according to claim 1, wherein said two light-receiving elements have different widths in the main scanning direction.

5. A laser beam scanning apparatus according to claim 4, wherein the one of said two light-receiving elements located on the downstream side has a smaller width than the other one located on the upstream side.

6. A laser beam scanning apparatus according to claim 1, wherein the first and second laser beam scan different lines.

7. An image forming apparatus comprising:
    a first laser source for emitting a first laser beam;
    a second laser source for emitting a second laser beam;
    deflecting means for deflecting the first and second laser beams emitted from said first and second laser sources;
    a photosensitive member to be scanned by the first and second laser beams;
    two light-receiving elements for receiving the first and second laser beams deflected by said deflecting means, said two light-receiving elements being juxtaposed in a main scanning direction; and
    control means for controlling laser beam emission timing of said first and second laser sources,
    wherein the laser beam emission timing of said first laser source is controlled on the basis of a timing when the first laser beam has reached a middle position between said two light-receiving elements and the laser beam emission timing of said second laser source is controlled on the basis of a timing when the second laser beam has reached the middle position, such that said second laser source is off when the first laser beam reaches the middle position and said first laser source is off when the second laser beam reaches the middle position.

8. An image forming apparatus according to claim 7, wherein said control means deems that the laser beam has reached the middle position when said two light-receiving elements show a same output level.

9. An image forming apparatus according to claim 7, wherein said second laser source is off until the first laser beam reaches the middle position and thereafter said first laser source is turned off and said second laser source is turned on.

10. An image forming apparatus according to claim 7, wherein said two light-receiving elements have different widths in the main scanning direction.

11. An image forming apparatus according to claim 10, wherein the one of said two light-receiving elements located on the downstream side has a smaller width than the other one on the upstream side.

12. An image forming apparatus according to claim 7, wherein the first and second laser beam scan different lines.

* * * * *